US011228572B2

(12) United States Patent
Chen

(10) Patent No.: US 11,228,572 B2
(45) Date of Patent: Jan. 18, 2022

(54) DATA TRANSMISSION SYSTEM AND METHOD WITH HIGH SECURITY

(71) Applicant: AhP-Tech Inc., New Taipei (TW)

(72) Inventor: Chao-Huang Chen, New Taipei (TW)

(73) Assignee: AHP-TECH INC., Taipei (TW)

( * ) Notice: Subject to any disclaimer, the term of this patent is extended or adjusted under 35 U.S.C. 154(b) by 219 days.

(21) Appl. No.: 16/679,371

(22) Filed: Nov. 11, 2019

(65) Prior Publication Data

US 2021/0075776 A1  Mar. 11, 2021

(30) Foreign Application Priority Data

Sep. 9, 2019  (TW) ................................. 108132494

(51) Int. Cl.
*H04L 29/06* (2006.01)
(52) U.S. Cl.
CPC ...... *H04L 63/0442* (2013.01); *H04L 63/0823* (2013.01); *H04L 63/123* (2013.01); *H04L 63/1466* (2013.01)
(58) Field of Classification Search
CPC ............. H04L 63/0442; H04L 63/0823; H04L 63/123; H04L 63/1466
See application file for complete search history.

(56) References Cited

U.S. PATENT DOCUMENTS 10,326,797 B1 *  6/2019  Murray .............. G06Q 20/3227
10,812,992 B1 * 10/2020  Tran ...................... B64C 39/024
2002/0010859 A1 *  1/2002  Maeda ................. H04N 19/176
    713/176
2002/0053049 A1 *  5/2002  Shiomoto .......... H04N 21/4382
    714/701
2008/0114687 A1 *  5/2008  Watanabe ............. H04L 9/0822
    705/51
2010/0306548 A1 * 12/2010  Kravitz ................. H04L 9/3263
    713/182
2012/0291124 A1 * 11/2012  Maria ................. H04W 12/088
    726/22
2013/0195087 A1 *  8/2013  Jamadagni ............ H04J 3/1694
    370/336
2016/0344628 A1 * 11/2016  Hocker ............... H04L 12/4633
2021/0099976 A1 *  4/2021  Mueck .................. H04W 72/04

* cited by examiner

*Primary Examiner* — Nance M Little
(74) *Attorney, Agent, or Firm* — Schmeiser, Olsen & Watts, LLP

(57) ABSTRACT

Data transmission system and method with high security are introduced for communicative connection of a transmitter device to a receiver device through a data transmission channel. The transmitter device includes multiple asymmetric encoding packers, and the receiver device includes a multiplex-decoding processor corresponding to the asymmetric encoding packers. After the transmitter device performs pre-processing on original data according to a source of the original data, the asymmetric encoding packers perform encoding packing on the pre-processed original data and generate multiple encoded data. The encoded data are sent to the receiver device through the data transmission channel, and are decoded by the multiplex-decoding processor to obtain restored data. Accordingly, enhancing security and convenience of data transmission are achieved.

16 Claims, 12 Drawing Sheets

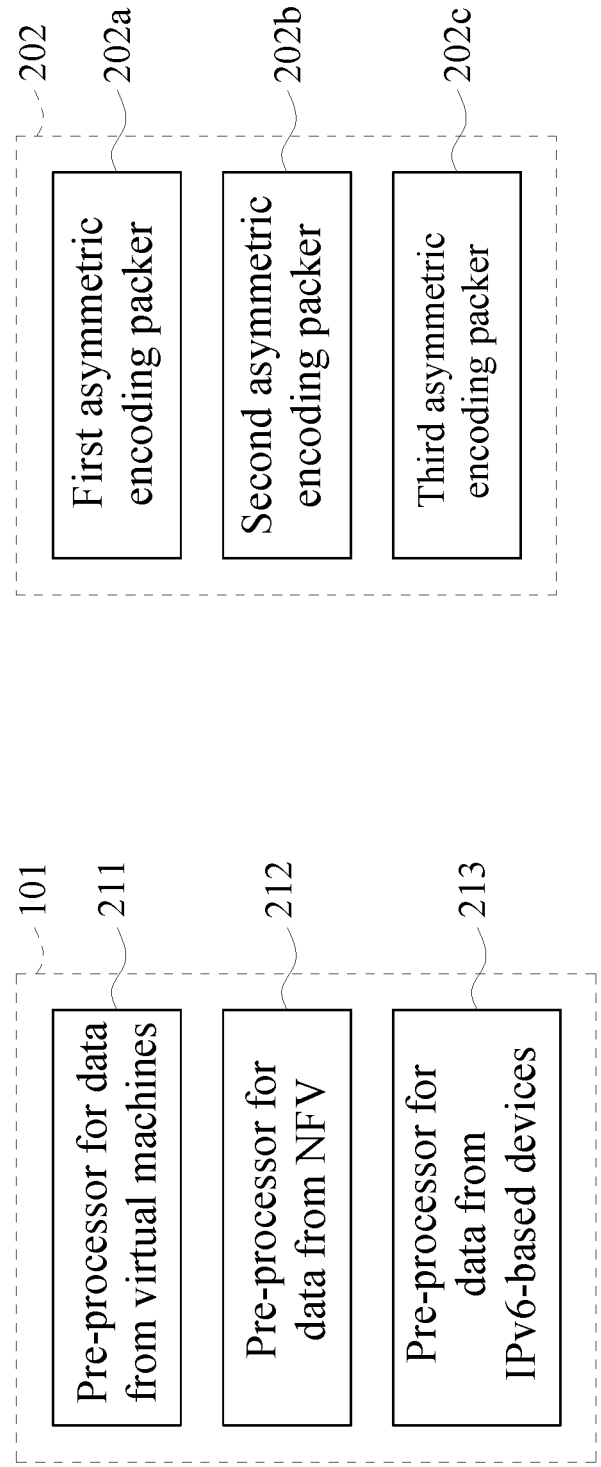

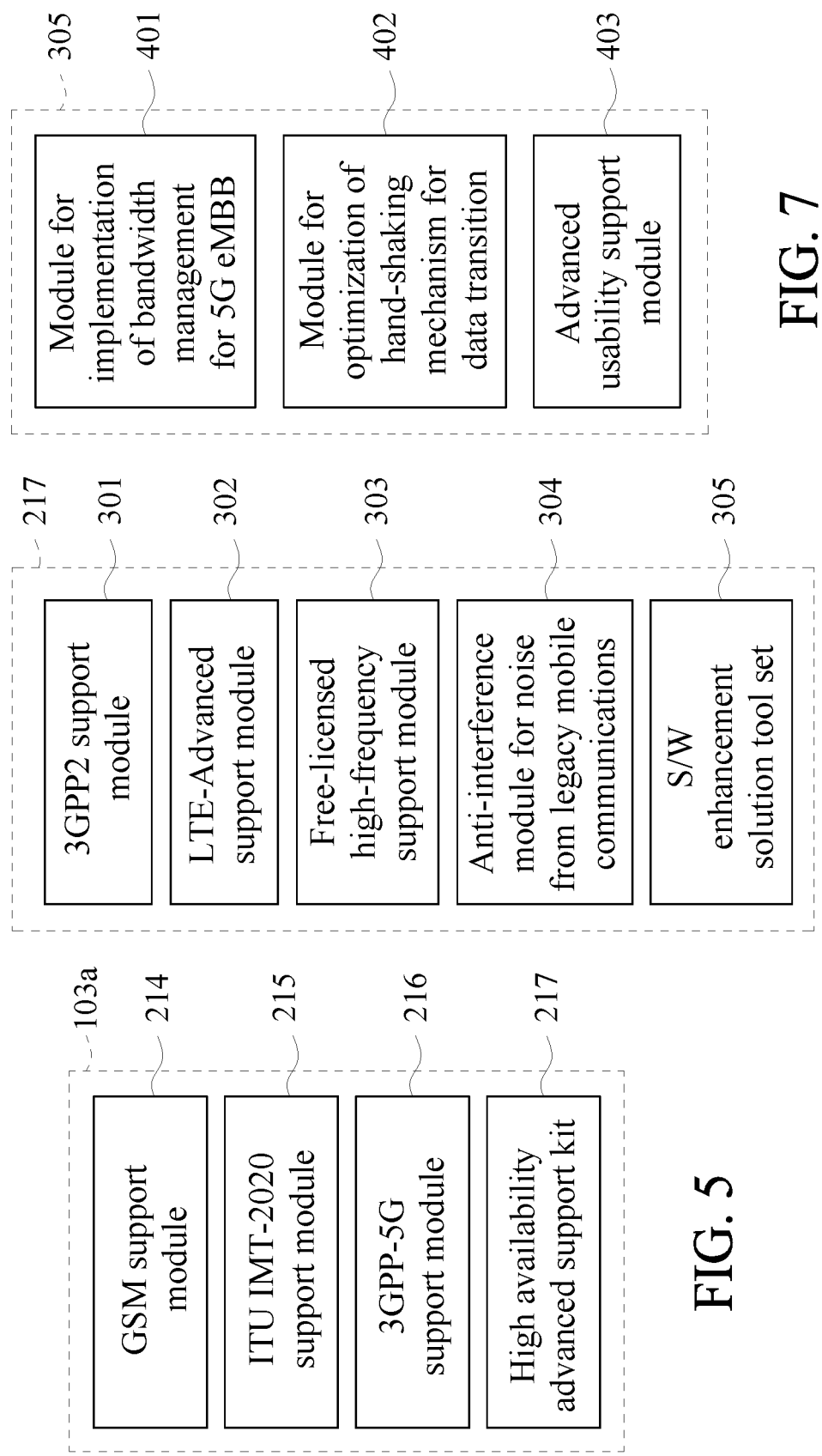

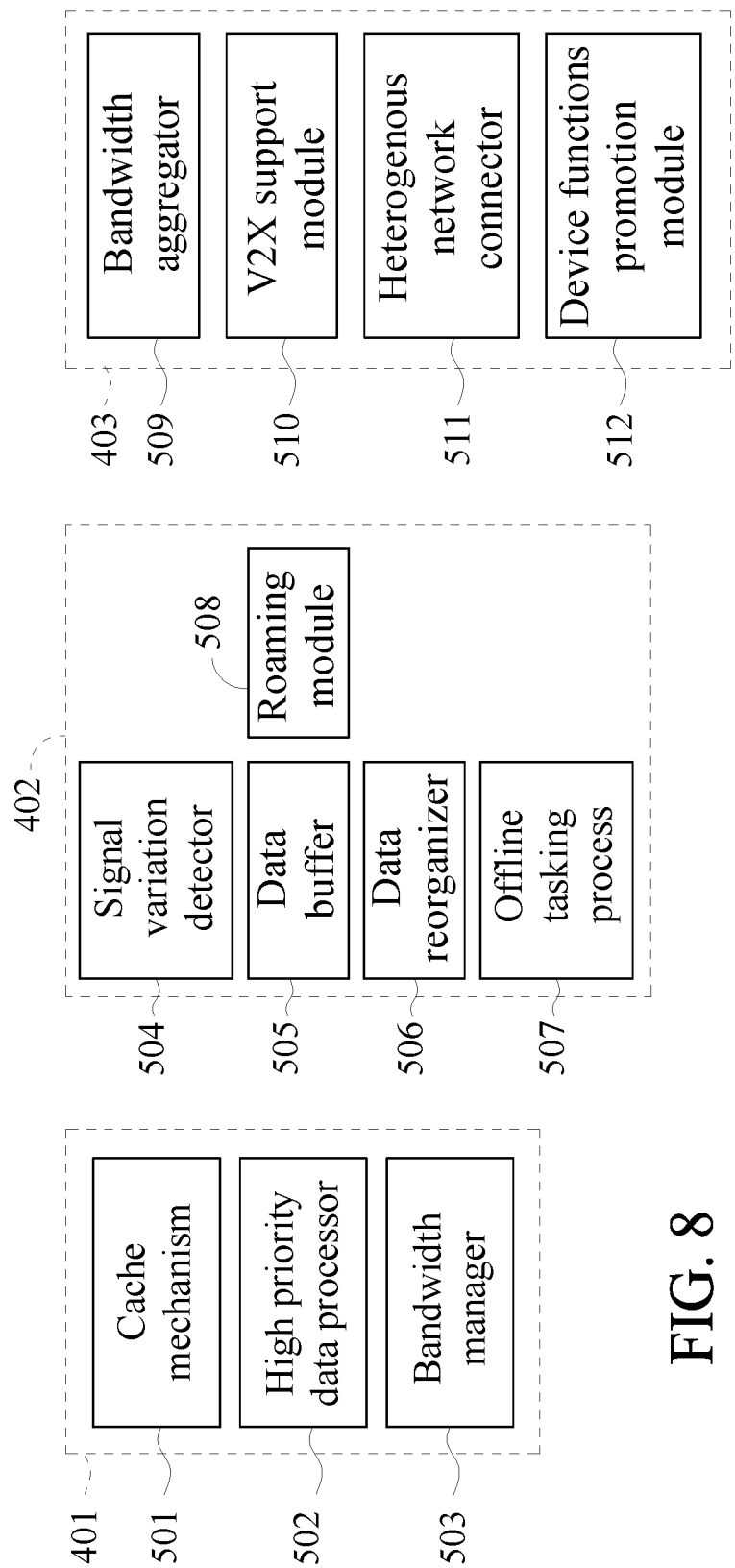

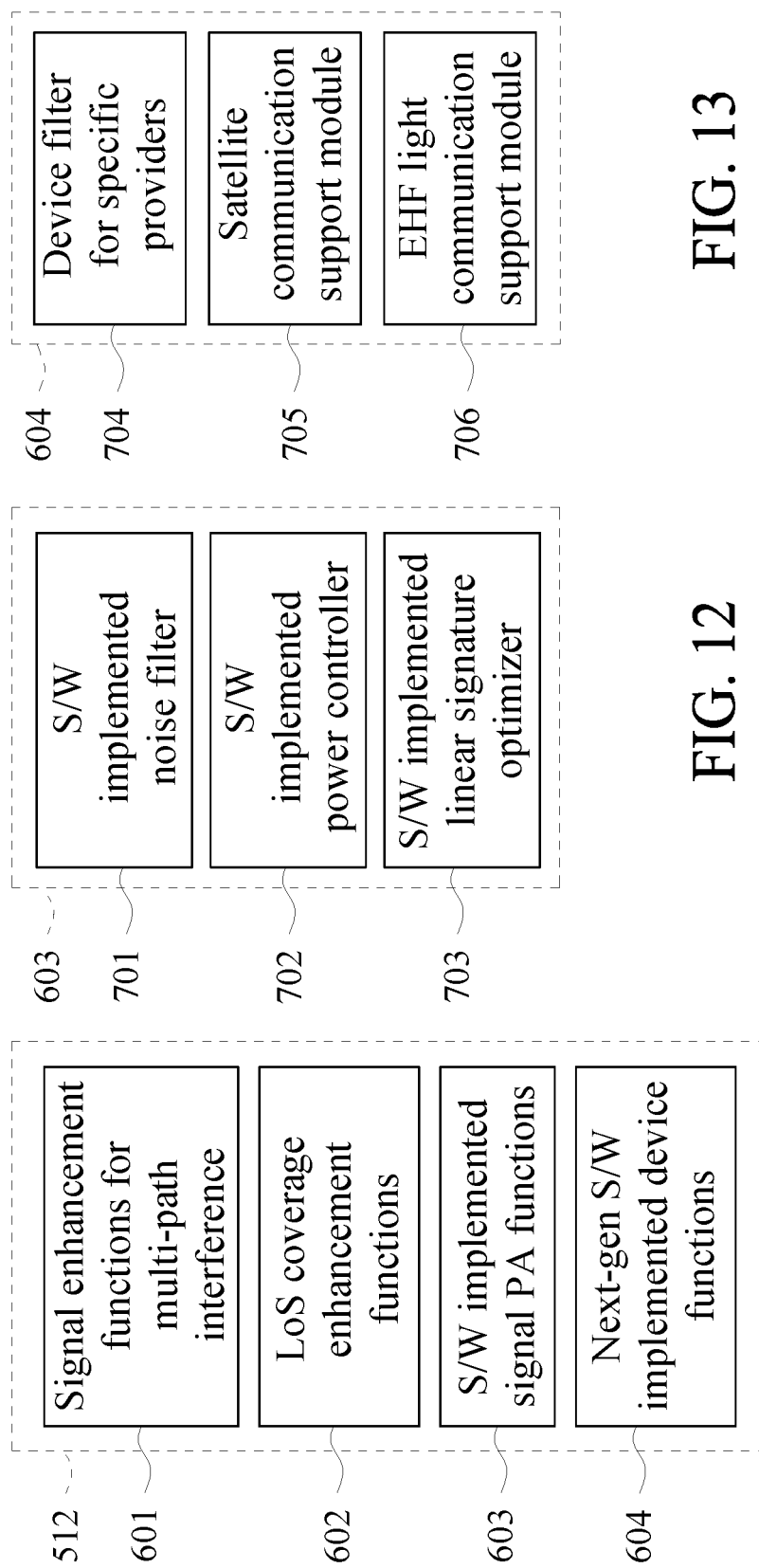

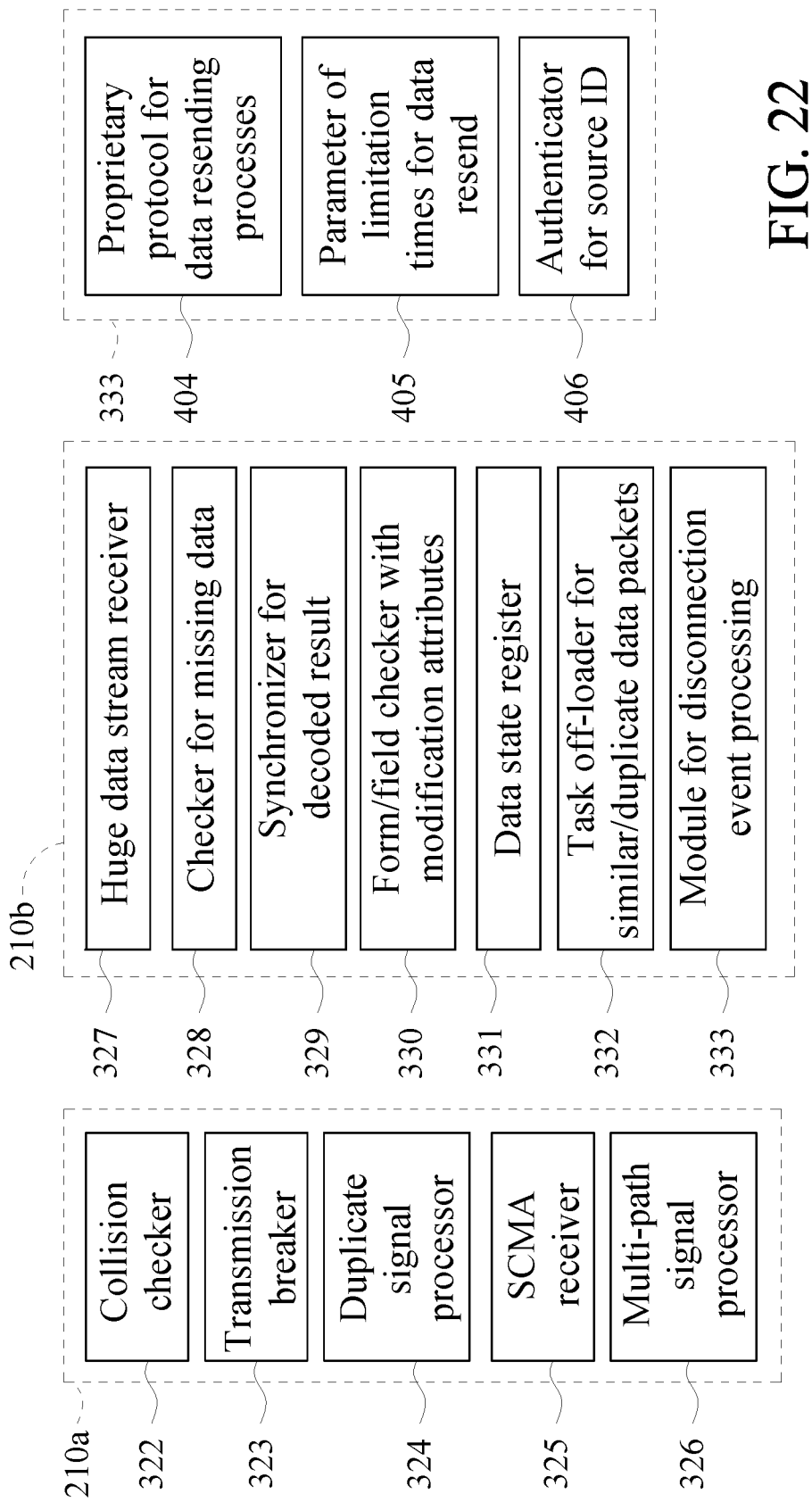

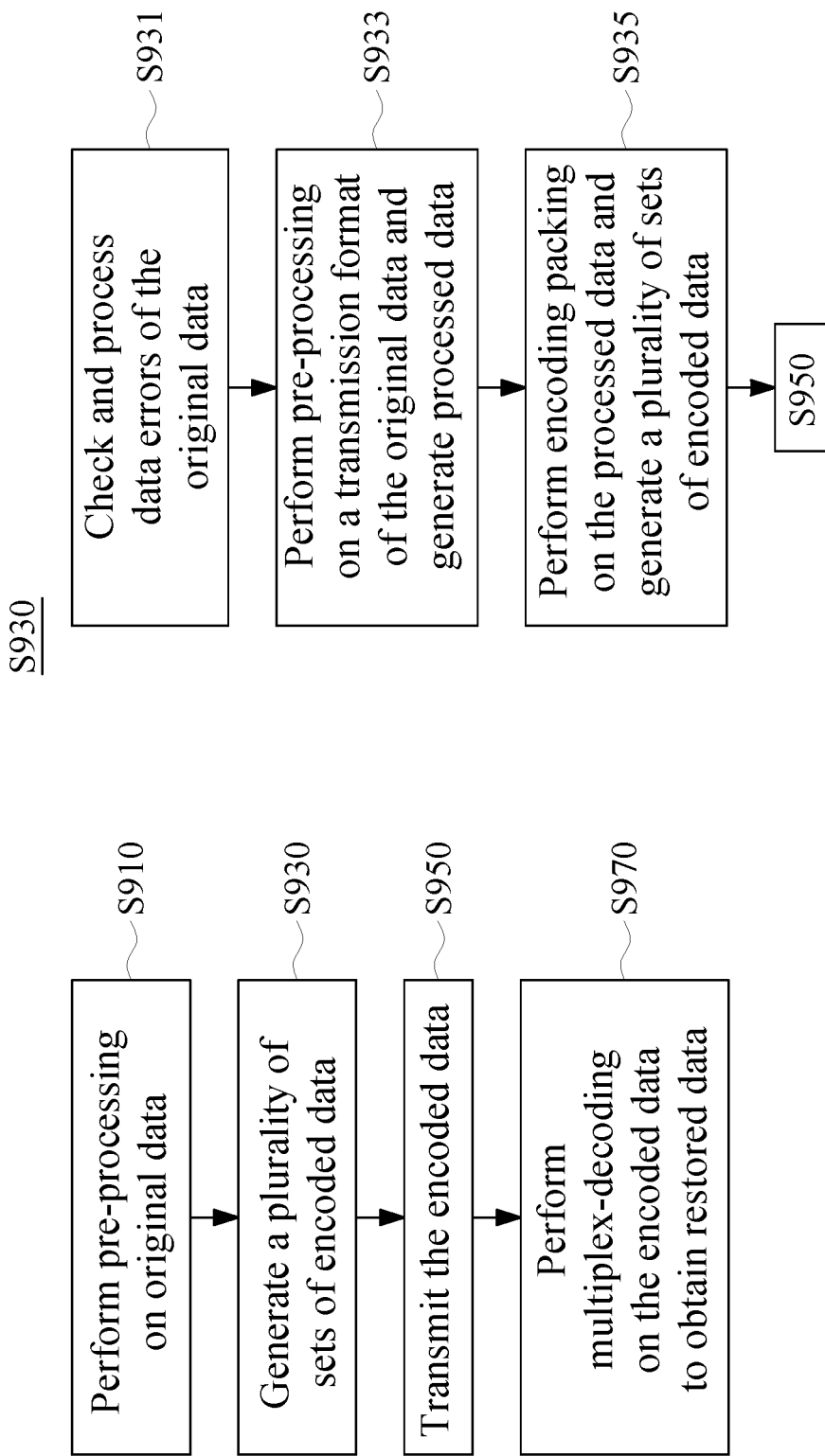

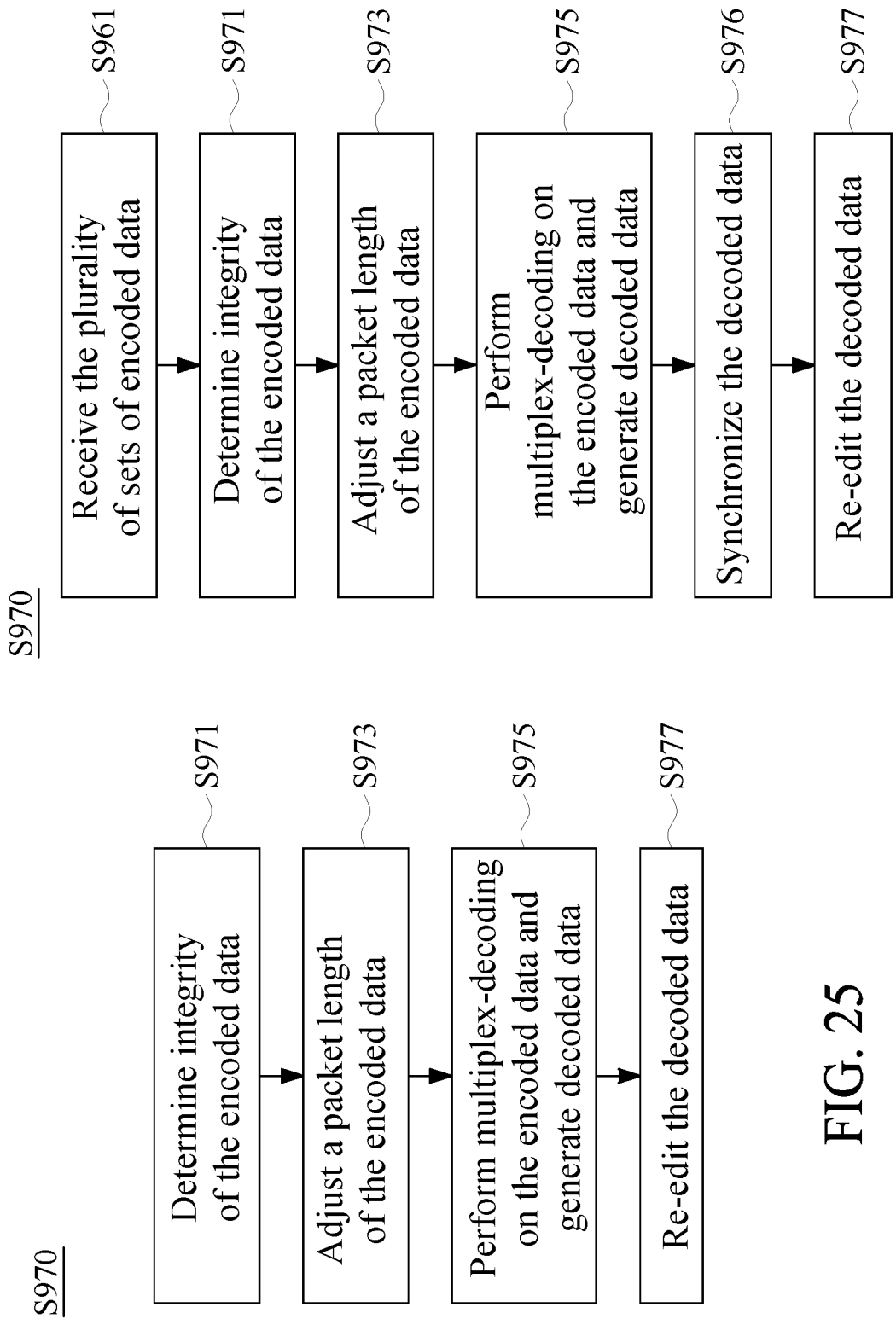

DATA TRANSMISSION SYSTEM AND METHOD WITH HIGH SECURITY

CROSS-REFERENCE TO RELATED APPLICATION

This non-provisional application claims priority under 35 U.S.C. § 119(a) on Patent Application No(s). 108132494 filed in Taiwan, R.O.C. on Sep. 9, 2019, the entire contents of which are hereby incorporated by reference.

BACKGROUND OF THE INVENTION

1. Field of the Invention

The present invention relates to a data transmission system and method, and in particular, to a data transmission system and method with high security and suitable for multiple data sources.

2. Description of the Related Art

Current common data transmission technologies mostly use known academic theories to implement secure transmissions and communication mechanisms thereof. However, the time needed for reverse cracking of such conventional techniques is constantly shortened under the rapid development of artificial intelligence (AI) and processors. In addition, when facing multiple heterogeneous communication channels (e.g., wired communications, wireless communications and mobile communications), instead of reacting to multiple transmission protocols by one single integrated security structure, it is often that only individual security enhancement can be performed with respect to the transmission protocol of one individual communication channel, resulting in ever-increasing difficulties and costs for security maintenance of an overall system.

In addition, a big data era has been entered for current data transmission, and data amounts from non-conventional source apparatuses keep expanding, while transmission protocols of heterogeneous networks are also persistently changing (e.g., the Fifth Generation Mobile Communication). It is evident that, attending to transmission security of various communication channels by using the prior art can be extremely challenging.

Therefore, it is desirable to have improvements on the conventional approach.

BRIEF SUMMARY OF THE INVENTION

In view of the drawbacks of the prior art, it is a primary object of the present invention to provide a data transmission system and a method with high security, the system and method being capable of receiving data streams from different sources and increasing complexity during transmission of the data streams, thereby enhancing security and convenience of data transmission.

To achieve the above object, a data transmission method with high security is provided according to an aspect of the present invention for use in communicative connection of a transmitter device to a receiver device through a data transmission channel. The method includes the steps of: performing, by the transmitter device, pre processing of original data according to a source of the original data performing, by the transmitter device, a plurality of asymmetric encoding packing processes on the pre-processed original data to generate a plurality of sets of encoded data; sending the encoded data through the data transmission channel; and performing, by the receiver device, multiplex-decoding on the encoded data received to obtain restored data.

According to the steps above, after the transmitter device performs pre-processing on the original data according to the source of the original data, the plurality of asymmetrical encoding packing processes are performed on the individual sets of pre-processed original data and the corresponding encoded data are generated, and the encoded data are transmitted to the receiver device through the data transmission channel, such that the receiver device performs multiplex-decoding on the encoded data received to obtain the restored data. Accordingly, original data from different sources can be processed and complexity of encoded data can be increased, thereby achieving the object of enhancing security and convenience of data transmission.

To achieve the above object, the data transmission system high security according to another aspect of the present invention includes: a transmitter device, including a device type identifier and an encoding packing module, wherein the device type identifier performs pre-processing on original data according to a source of the original data, and the encoding packing module includes a pre-processor prior to encoding packing and a plurality of asymmetric encoding packers, wherein the pre-processor prior to encoding packing performs pre-processing on a transmission format of the original data and generates processed data, and the asymmetric encoding packers respectively receive the processed data and generate a plurality of sets of encoded data; and a receiver device, communicatively connected to the transmitter device through a data transmission channel, the receiver device including a decoding module, wherein the decoding module includes a multiplex-decoding processor for performing multiplex-decoding on the encoded data received to obtain restored data.

According to the structure above, the data transmission system with high security includes the transmitter device and the receiver device. The transmitter device includes the device type identifier and the encoding packing module, wherein the encoding packing module includes the pre-processor prior to encoding packing and the plurality of asymmetric encoding packers. The receiver device includes the decoding module. The device type identifier performs pre-processing on the original data, the pre-processor prior to encoding packing is used for performing pre-processing on the transmission formal of the original data and generating the processed data, the asymmetric encoding packers respectively encode the processed data to generate the encoded data, and the decoding module performs multiplex-decoding upon receiving the encoded data through the data transmission channel to obtain the restored data. Thus, the present invention is capable of processing original data from different sources and increasing complexity of encoded data, thereby achieving the object of enhancing security and convenience of data transmission.

BRIEF DESCRIPTION OF THE DRAWINGS

FIG. 3 is a structural block diagram of a device type identifier according to a preferred embodiment of the present invention.

FIG. 4 is a structural block diagram of a plurality of asymmetric encoding packers according to a preferred embodiment of the present invention.

FIG. 5 is a structural block diagram of a device implementing a data transmission channel according to a preferred embodiment of the present invention.

FIG. 6 is a structural block diagram of a high availability advanced support kit according to a preferred embodiment of the present invention.

FIG. 7 is a structural block diagram of a S/W enhancement solution tool set according to a preferred embodiment of the present invention.

FIG. 8 is a structural block diagram of a module for implementation of bandwidth management for 5G eMBB according to a preferred embodiment of the present invention.

FIG. 9 is a structural block diagram of a module for optimization of hand shaking mechanism for data transition according to a preferred embodiment of the present invention.

FIG. 10 is a structural block diagram of an advanced usability support module according to a preferred embodiment of the present invention.

FIG. 11 is a structural block diagram of a device functions promotion module according to a preferred embodiment of the present invention.

FIG. 12 is a structural block diagram of a S/W implemented signal PA functions according to a preferred embodiment of the present invention.

FIG. 13 is a structural block diagram of a next-gen S/W implemented device functions according to a preferred embodiment of the present invention.

FIG. 14 is a structural block diagram of a satellite communication support module according to a preferred embodiment of the present invention.

FIG. 15 is a structural block diagram of a target satellite switch according to a preferred embodiment of the present invention.

FIG. 16 is a structural block diagram of a multiplex-decoding processor according to a preferred embodiment of the present invention.

FIG. 20 is a structural block diagram of a first advanced optimization module according to a preferred embodiment of the present invention.

FIG. 21 is a structural block diagram of a second advanced optimization module according to a preferred embodiment of the present invention.

FIG. 22 is a structural block diagram of a module for disconnection event processing according to a preferred embodiment of the present invention.

FIG. 23 is a flowchart of a method according to a preferred embodiment of the present invention.

FIG. 24 is a flowchart of a sub-method according to a preferred embodiment of the present invention.

FIG. 25 is a flowchart of another sub-method according to a preferred embodiment of the present invention.

FIG. 26 is a flowchart of another sub-method according to a preferred embodiment of the present invention.

DETAILED DESCRIPTION OF THE INVENTION

To facilitate understanding of the object, characteristics and effects of this present disclosure, embodiments together with the attached drawings for the detailed description of the present disclosure are provided.

Figure 1:
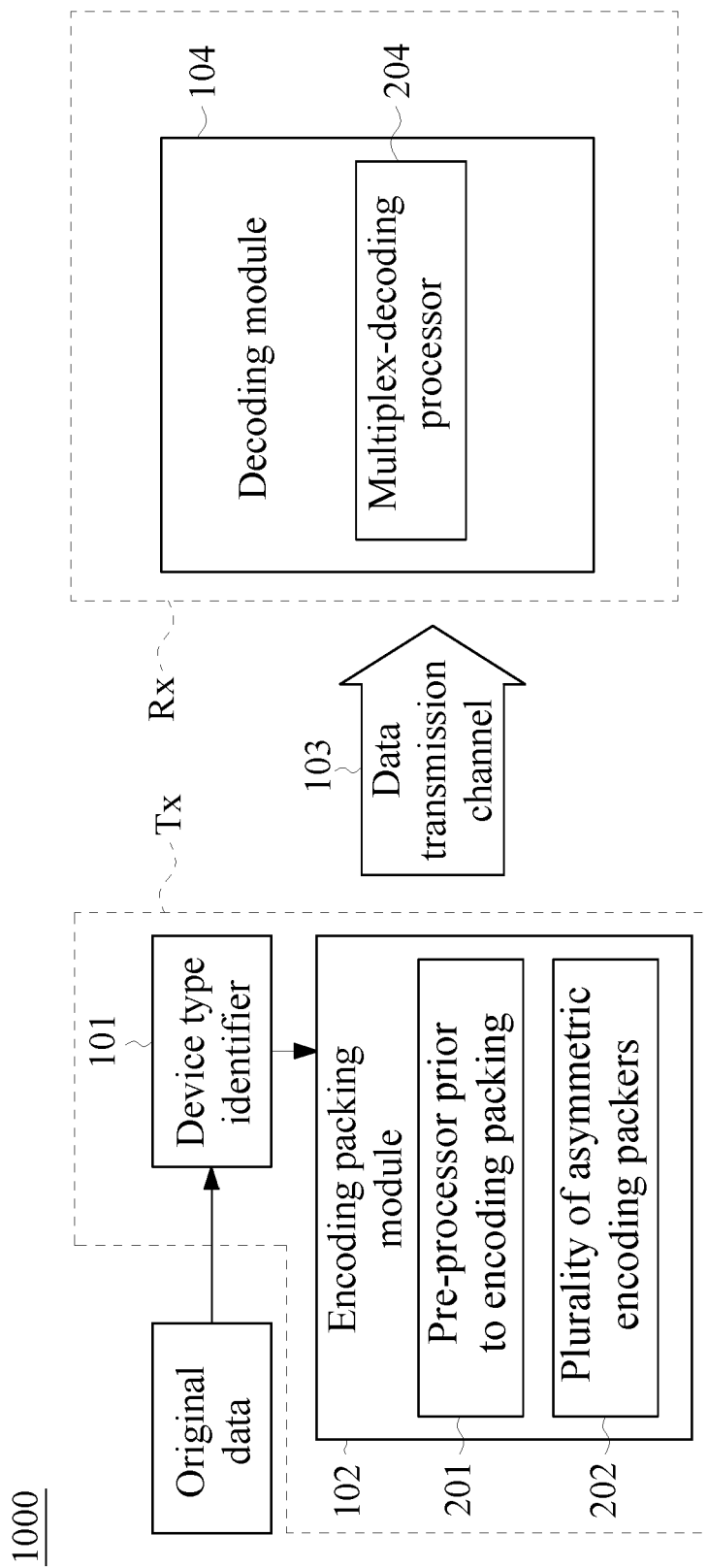
FIG. 1 is a structural block diagram of a system according to a preferred embodiment of the present invention.

In regard to a data transmission system with high security (to be referred to as a system 1000 hereinafter) according to a preferred embodiment of the present invention, referring to FIG. 1, the system 1000 includes a transmitter device Tx and a receiver device Rx. The transmitter device Tx and the receiver device Rx are mutually communicatively connected through a data transmission channel 103 so as to perform data transmission. In the preferred embodiment, the data transmission channel 103 can be formed by more than one communication protocol, the transmitter device Tx is used for receiving original data and performing asymmetric encoding packing on the original data to generate a plurality of sets of encoded data, wherein the encoded data are transmitted to the receiver device Rx through the data transmission channel, and the receiver device Rx can obtain restored data by way of multiplex-decoding, wherein data contents of the restored data are the same as those of the original data.

Further, the transmitter device Tx includes a device type identifier 101 and an encoding packing module 102. The device type identifier 101 is used for performing pre-processing on the original data according to a source of the original data. The encoding packing module 102 is used for performing pre-processing on a transmission format of the original data and generating the encoded data.

The encoding packing module 102 includes a pre-processor prior to encoding packing 201 and a plurality of asymmetric encoding packers 202. The pre-processor prior to encoding packing 201 is used for performing pre-processing on the transmission format of the original data and generating processed data. The pre-processor prior to encoding packing 201 performs length alignment processing of the data format of the original data, adds a customized header format, determines encoding length associated parameters, and forwards the processed data generated after adjustment to at least one of the asymmetric encoding packers 202. The plurality of asymmetric encoding packers 202 are used for respectively performing asymmetric encoding packing on the processed data and generating the encoded data, wherein the asymmetric encoding does not refer to any known commercial encryption algorithms, but can refer to reverse restoration or decoding of an encoding algorithm, which is not identical to that used by the asymmetric encoding packers 202 and the receiver device Rx.

Further, the receiver device Rx includes a decoding module 104. The decoding module 104 includes a multiplex-decoding processor 204, which is used for establishing a processing process capable of simultaneously analyzing different encoding algorithms, so as to perform multiplex-decoding on the encoded data received to obtain the restored data.

In this preferred embodiment, the transmitter device Tx and the receiver device Rx can be implemented by servers, wherein the server implementing the transmitter device Tx can be used to run processes corresponding to the device type identifier 101 and the encoding packing module 102, and the server implementing the receiver device Rx can be used to run a process corresponding to the decoding module 104.

Hence, the system 1000 of the present invention can perform corresponding pre-processing by the device type identifier 101 according to the source of the original data, and thus the system 1000 is compatible to the original data from different sources. Further, by using the asymmetric encoding packers 202, asymmetric encoding packing can be performed respective y on the original data, further increasing the complexity of the encoded data, thereby achieving enhancing security and convenience of data transmission.

Figure 2:
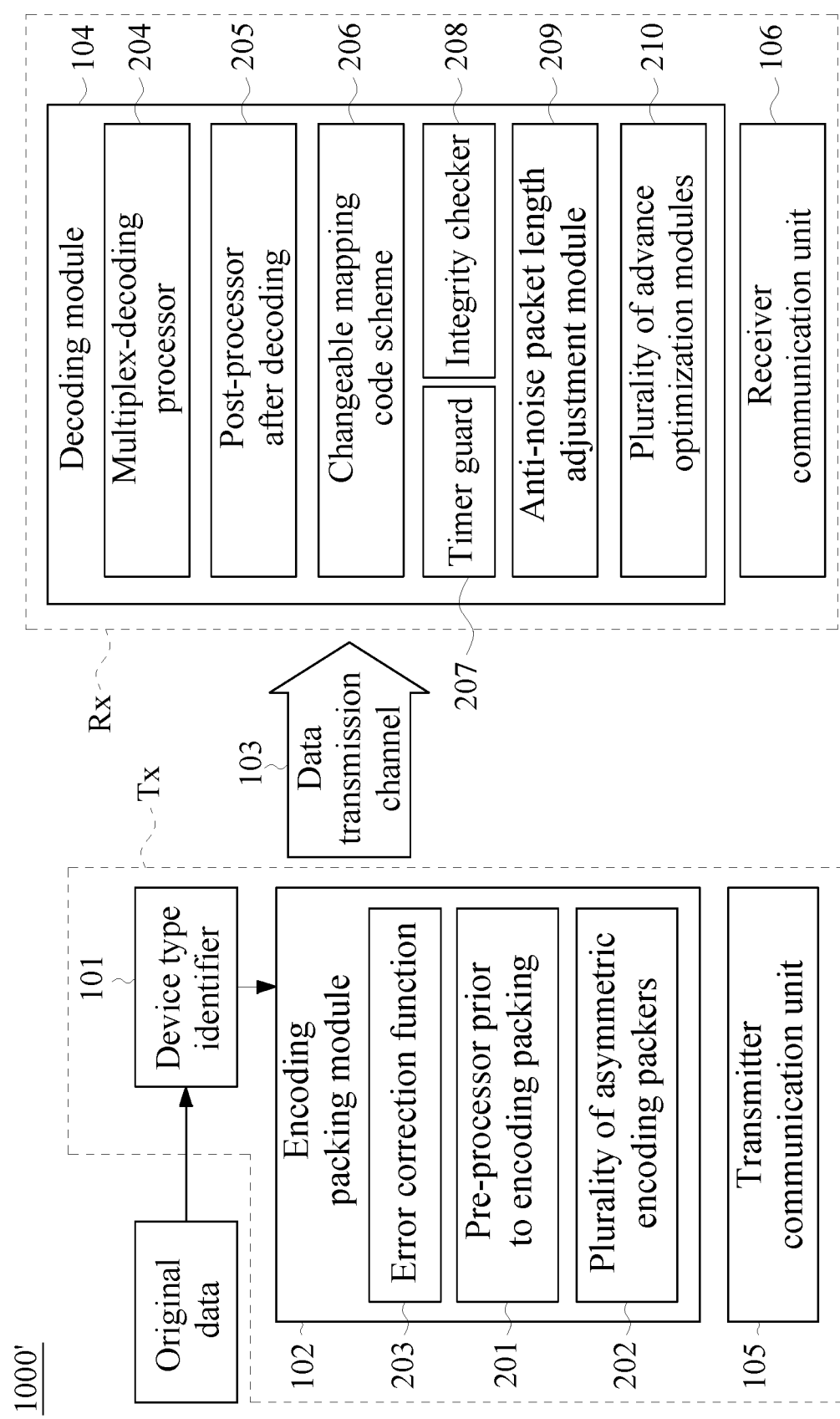
FIG. 2 is another structural block diagram of a system according to a preferred embodiment of the present invention.

In regard to a data transmission system (to be referred to as a system 1000' hereinafter) with high security according to another preferred embodiment of the present invention, referring to FIG. 2, the system 1000' differs from the system 1000 in that the transmitter device Tx further includes a transmitter communication unit 105 and the encoding packing module 102 further includes an error correction function 203. The transmitter communication unit 105 is used for having the encoded data be transmitted to the receiver device Rx by a communication protocol corresponding to the data transmission channel 10. The error correction function 203 is used for checking and processing data errors of the original data prior to encoding so as to enhance data accuracy.

The receiver device Rx of the system 1000' further includes a receiver communication unit 106. The receiver communication unit 106 is used for receiving by the communication protocol through the data communication channel the encoded data sent from the transmitter device Tx. The decoding module 104 of the receiver device Rx further includes a post-processor after decoding 205, a changeable encoding mapping scheme 206, a timer guard 207, an integrity checker 208, an anti-noise packet length adjustment module 209, and a plurality of advanced optimization modules 210.

The post-processor after decoding 205 performs a post-processing process on the decoded data generated from decoding by the multiplex-decoding processor 204. The changeable encoding mapping scheme 206 is used for re-editing the decoded data by using a customized shift and rotate algorithm, so as to ensure data security before restoration of the restored data. The timer guard 207 is used for timing a protection time of decoding/encoding and accordingly setting a guard, and if the receiver device Rx is unable to complete decoding/encoding within a predetermined period and cancel the guard, the transmitter device Rx will end data transmission, so as to prevent the receiver device Rx from consuming excessive resources for processing the encoded data that cannot be successfully decoded/encoded. The integrity checker 20 is used for determining the integrity of the encoded data. The adjustable anti-noise packet length adjustment module 209 is used for avoiding an inappropriate packet length of the encoded data, wherein such length may cause the encoded data to not lie easily restored due to interference and collision. The plurality of advanced optimization modules 210 are used for ensuring the output quality of the restored data.

In this preferred embodiment, the device type identifier 101 can include a pre-processor for data from virtual machines 211, a pre-processor for data from NFV 212, and a pre-processor for data from IPv6-based devices 213. Referring to FIG. 3, the pre-processor for data from virtual machines 211 is used for pre-processing original data of data streams from virtual machines, the pre-processor for data from NFV 212 is used for pre-processing original data of data streams from NFV (Networking Function Virtualization), and the pre-processor for data from IPv6-based devices 213 is used for pre-processing original data of data streams from common IPv6-based devices. Hence, the device type identifier 101 can be suitably used for receiving original data from different sources, effectively enhancing convenience of data transmission.

In this preferred embodiment, the asymmetrical encoding packers 202 can be three asymmetric encoding packers, for example, as shown in FIG. 4. However, the present invention is not limited to such example. The asymmetric encoding packers 202 include a first asymmetric encoding packer 202*a*, a second asymmetric encoding packer 202*b* and a third asymmetric encoding packer 202*c*. Thus, the processed data corresponding to the same original data can be encoded and packed by one, two or three asymmetric encoding packers. In one embodiment, the processed data can be selectively encoded and packed by time first asymmetric encoding packer 202*a*, the second asymmetric encoding packer 202*b* or the third asymmetric encoding packer 202*c* to generate the corresponding encoded data. In another embodiment, the processed data can be encoded and packed by two of the first asymmetric encoding packer 202*a*, the second asymmetric encoding packer 202*b* and the third asymmetric encoding packer 202*c* to generate a plurality corresponding encoded data; alternatively, the amounts of data of the asymmetric encoding packers can be individually adjusted. For example, the processed data corresponding to 45% of the data amount of the original data can be encoded and packed by the first asymmetric encoding packer 202*a*, and the processed data corresponding to 55% of the data amount of the original data can be encoded and packed by the second asymmetric encoding packer 202*b*. However, the present invention is not limited to such example. In yet another example, the processed data can be simultaneously encoded and packed by the first asymmetric encoding packer 202*a*, the second asymmetric encoding packer 202*b* and the third asymmetric encoding packer 202*c* to generate a plurality of sets of encoded data. For example, the processed data corresponding to 25% of the data amount of the original data can be encoded and packed by the first asymmetric encoding packer 202*a*, the processed data corresponding to 55% of the data amount of the original data can be encoded and packed by the second asymmetric encoding packer 202*b*, and the processed data corresponding to 20% of the data amount of the original data can be encoded and packed by the third asymmetric encoding packer 202*c*, and first asymmetric encoding packer 202*a*, the second asymmetric encoding packer 202*b* and the third asymmetric encoding packer 202*c* then respectively generate the corresponding encoded data. By the way, there are no restrictions that the corresponding amount of the original data should be in the native data byte order for the above examples. Certainly, the present invention is not limited to such example, and any other approach may be employed where appropriate.

Further, in this preferred embodiment, the data transmission channel 103 can be formed by a device 103*a*. Referring to FIG. 5, the device 103*a* includes a GSM support module 214, an ITU IMT-2020 support module 215, a 3GPP-5G support module 216 and a high availability advanced support kit 217. The GSM support module 214 is used for supporting the GSM communication protocol. The ITU IMT-2020 support module 215 is used for supporting the ITU IMT-2020 protocol. The 3GPP-5G support module 216 is used for supporting the NR (5G) communication protocol defined by the 3GPP Organization. The high availability advanced support kit 217 is used for supporting other universal communication protocols to enhance availability of transmission channels in aspects of commercial operation. The device 103a can be implemented by a base station or a ground station; however, the present invention is not limited to such examples.

In this preferred embodiment, the high availability advanced support kit 217 includes a 3GPP2 support module 301, an LTE-Advanced support module 302, a free-licensed high-frequency support module 303, an anti-interference module for noise from legacy mobile communications 304, and a S/W enhancement solution tool set 305. As shown in FIG. 6, the 3GPP2 support module 301 is used for supporting communication protocols defined by the 3GPP2 Organization, the LTE-Advanced support module 302 is used for supporting the LTE-Advanced communication protocol, the free-licensed high-frequency support module 303 is used for supporting free-licensed high-frequency protocols, the anti-interference module for noise from legacy mobile communications 304 is used for eliminating signal interference caused by 2G, 3G and 4G communications in the environment, and the SSW enhancement solution tool set 305 can serve as a solution for issues of related hardware devices by software related technique. Thus, the systems 1000 and 1000' can further support different communication protocols and be conveniently applied in various system structures, effectively enhancing convenience of data transmission.

In this preferred embodiment, the S/W enhancement solution tool set 305 includes a module for implementation of bandwidth management for 5G eMBB 401, a module for optimization of hand-shaking mechanism for data transition 402, and an advanced usability support module 403. As shown in FIG. 7, the module for implementation of bandwidth management for 5G eMBB 401 is used for implementing bandwidth management of 5G eMBB by using software solutions, the module for optimization of hand-shaking mechanism for data transition 402 is used for optimizing a hand-shaking mechanism of 5G communications and base stations by using software solutions, and the advanced usability support module 403 is used for supporting related advanced communication protocols above 5G communications or improving drawbacks thereof by using software solutions.

In this preferred embodiment, the module for implementation of bandwidth management for 5G eMBB 401 includes a cache mechanism 501, a high priority data processor 502 and a bandwidth manager 503. As shown in FIG. 8, the cache mechanists 501 is used for enhancing bandwidth utilization efficiency, the high priority data processor 502 is used for providing a priority mechanism for processing data with high priority, and the bandwidth manager 503 is used for defining different management mechanism according to properties of transmission media, wherein the transmission media are, for example, cables, networks, air or electric waves. Thus, the systems 1000 and 1000' of the present invention can farther ensure quality of bandwidth management.

In this preferred embodiment, the module for optimization of hand-shaking mechanism for data transition 402 includes a signal variation detector 503, a data buffer 505, a data reorganizer 506, an offline tasking process 507 and a roaming module 508. As shown in FIG. 9, the signal variation detector 504 is used for detecting signal variation of a mobile communication base station (e.g., a 5G communication base station), the data buffer 505 is used for providing a data buffering mechanism, the data reorganizer 506 is used for reorganizing received data and restoring an original sequence of the restored data so as to improve benefits of data processing, the offline tasking process 507 is used for processing offline tasking, and the roaming module 508 can support and optimize transmission quality of communication roaming.

In this preferred embodiment, the advanced usability support module 403 includes a bandwidth aggregator 509, a V2X (Vehicle-to-Everything) support module 510, a heterogeneous network connector 511 and a device functions promotion module 512. As shown in FIG. 10, the bandwidth aggregator 509 is used for supporting bandwidth aggregation by software, the V2X support module 510 is used for supporting the V2X communication protocol, the heterogeneous network connector 511 is used for supporting heterogeneous network communication protocols, and the device functions promotion module 512 is used for enhancing functions of related devices by using software solutions.

In this preferred embodiment, the device functions promotion module 512 includes a signal enhancement functions for multi-path interference 601, a LoS coverage enhancement functions 602, a S/W implemented signal PA functions 603, and a next-gen S/W implemented device functions 604. As shown in FIG. 11, the signal enhancement functions for multi-path interference 601 is used for improving multi-path interference of 5G signals by using software, the LoS coverage enhancement functions 602 is used for enhancing LoS (Line of Sight) coverage quality of 5G signals by using software, the S/W implemented signal PA functions 603 is used for providing a signal amplifier solution by using software, and the next-gen S/W implemented device functions 604 is used for extending technical functions by using software to cover more next-generation communication transmission requirements.

In this preferred embodiment, the S/W implemented signal PA functions 603 includes a S/W implemented noise filter 701, a S/W implemented power controller 702 and a S/W implemented linear signature optimizer 703. As shown in FIG. 12, the S/W implemented noise filter 701 is used for filtering out noise by using software, the S/W implemented power controller 702 is used for performing signal power management by using software, and the S/W implemented linear signature optimizer 703 is used for optimizing characteristics of linear function for a power amplifier by using a software solution.

In this preferred embodiment, the next-gen S/W implemented device functions 604 includes a device filter for specific providers 704, a satellite communication support module 705, and an EHF light communication support module 706. As shown in FIG. 13, the device filter for specific providers 704 is used for filtering out signals of a device of a specific manufacturer (e.g., Huawei) by using a software solution, the satellite communication support module 705 is used for supporting specific satellite communication transmission by using a software solution, and the EHF light communication support module 706 is used for supporting EHF light communication protocols.

In this preferred embodiment, the satellite communication support module 705 includes a target satellite switch 801, a channel switch module 802, a communication module with satellite base station 803 and a S/W implemented positioning functions 804. As shown in FIG. 14, the target satellite switch 801 is used for setting and switching to a supported target satellite channel, the channel switch module 802 is used for supporting switching of military channels and common civilian channels, the communication module with satellite base station 803 is used for communicating information with a satellite base station, and the S/W implemented positioning functions 804 is used for supporting satellite positioning by using software.

In this preferred embodiment, the target satellite switch 801 includes an Amazon Kuiper support module 901, a scientific satellite support module 902 and a medical satellite support module 903. As shown in FIG. 15, the Amazon Kuiper support module 901 is used for supporting Amazon satellite networks, the scientific satellite support module 902 is used for supporting satellite communications for scientific purposes, and the medical satellite support module 903 is used for supporting satellite communications for medical purposes.

In this preferred embodiment, the multiplex-decoding processor 204 further includes a specific protocol packet analyzer 306, a certificate checker 307, an encoder device identifier 308, a data length checker 309 and a timestamp checker 310. As shown in FIG. 16, the specific protocol packet analyzer 306 is used for analyzing SMTP, FTP or HTTP encrypted or non-encrypted protocol packets, the certificate checker 307 is used for checking whether a certificate of a user terminal (a transmitter) belongs to a legal user, the encoder device identifier 308 is used for determining whether the encoded data are from a legal device, the data length checker 309 is used for determining consistency between the value in the length field of the encoded data and the actual length of the encoded data, and the timestamp checker 310 is used for determining the legitimacy of the timestamp of packets.

Figure 17:
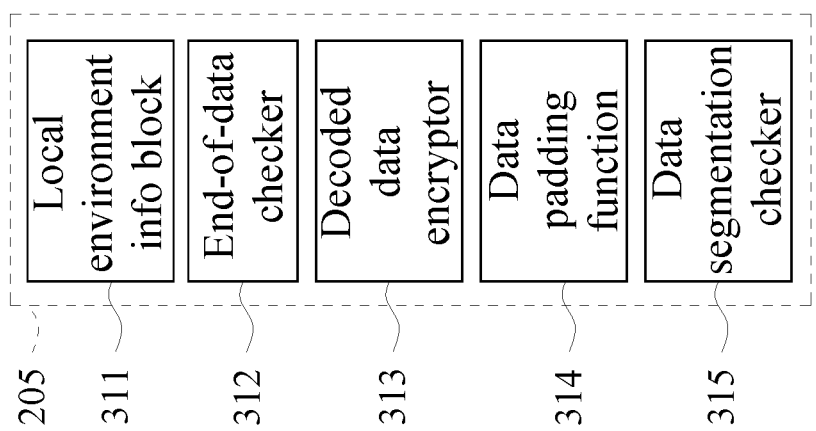
FIG. 17 is a structural block diagram of a post-processor after decoding according to a preferred embodiment of the present invention.

In this preferred embodiment, the post-processor after decoding 205 includes a local environment info block 311, an end-of-data checker 312, a decoded data encryptor 313, a data padding function 314 and a data segmentation checker 315. As shown in FIG. 17 the data structure of the local environment info block 311 is used for storing related information and parameters shared by a decoding/encoding mechanism and a changeable encoding mapping scheme, the end-of-data checker 312 is used for confirming that all decoded data needing to be received is collected, the decoded data encryptor 313 encrypts a result of a decoding process to et sure security before decoded data are again coded, the data padding function 314 performs padding on decoded data having an insufficient length, and the data segmentation checker 315 is used for checking an ending signature of a data scan ent of the decoded data, performing processing on the data segment before integration, and then performing the changeable encoding mapping scheme 206 on the decoded data.

Figure 18:
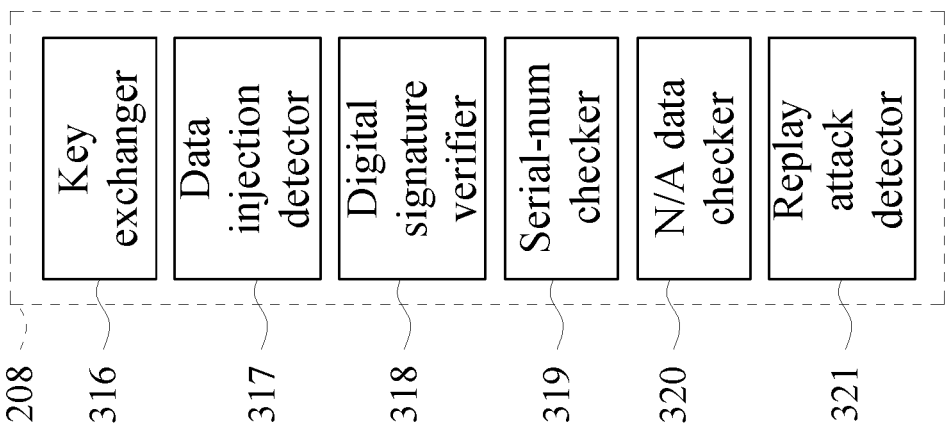
FIG. 18 is a structural block diagram of an integrity checker according to a preferred embodiment of the present invention.

In this preferred embodiment, the integrity checker 208 includes a key exchanger 316, a data injection detector 317, a digital signature verifier 318, a serial-num checker 319, an N/A data checker 320 and a replay attack detector 321. As shown in FIG. 18, the key exchanger 316 is used for implementing a key mechanism, such as a public-private key mechanism, so as to verify the integrity of the encoded data, the digital signature verifier 318 is used for verifying a digital signature so as to ensure the non-repudiation of the encoded data, the serial fauna checker 319 is used for checking serial numbers of the encoded packets to determine whether there, are lost packets, the N/A data checker 320 is used for determining whether any of the encoded data is lost to determine whether there is lost data byte, the replay attack detector 321 is used for determining whether there is a replay attack during the transmission process of the encoded data, and the data injection detector 317 is used for detecting whether additional data are injected into the encoded data.

Figure 19:
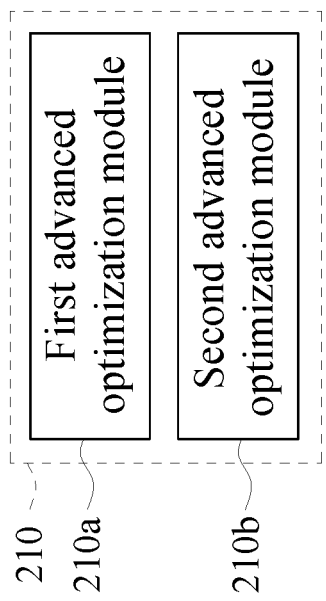
FIG. 19 is a structural block diagram of a plurality of advanced optimization modules according to a preferred embodiment of the present invention.

In this preferred embodiment, the advanced optimization modules 210 can include a first advanced optimization module 210a and a second advanced optimization module 210b, as shown in FIG. 19. However, the present invention is not limited to such example.

In this embodiment, the first advanced optimization module 210a includes a collision checker 322, a transmission breaker 323, a duplicate signal processor 324, a SCMA receiver 325 and a multi-path signal processor 326. As shown in FIG. 20, the collision checker 322 is used for detecting and processing situations of high-frequency signal collision, the transmission breaker 323 is used for triggering a transmission breaking mechanism when the signal quality is continuously poor and cannot be easily restored, the duplicate signal processor 324 is used for determining whether duplicate signals are valid for further processing, the SCMA receiver 325 is used for supporting an SCMA (Sparse Code Multiple Access) mechanism so as to enhance reception quality of high-frequency signals, and the multi-path signal processor 326 is used for processing time sequence issues of multi-path signals by using software. Thus, quality of high-frequency transmission can be ensured.

In this preferred embodiment, the second advanced optimization module 210b further includes a huge data stream receiver 327, a checker for missing data 328, a synchronizer for decoded result 329, a form field checker with modification attributes 330, a data state register 331, a task off-loader for similar/duplicate data packets 332, and a module for disconnection event processing 333. As shown in FIG. 21, the huge data stream receiver 327 is used for receiving huge data (the encoded data) within a short period, the checker for missing data 328 is used for detecting and processing situations where the receiver device Rx is incapable of receiving data, the synchronizer for decoded result 329 is used for providing a synchronization mechanism for results simultaneously decoded from different encoded data (e.g., the encoded data generated from encoding packing by different asymmetric encoding packers) so as to facilitate further combination into the restored data, the form/field checker with modification attributes 330 is used for identifying modifiable and non-modifiable parts in forms and fields of the data packets, and further determining whether current data contains unreasonable changes, the data state register 331 is used for processing stale records of data, the task off-loader for similar/duplicate data packets 332 is used for avoiding excessive waste in system resources for processing processes of the same or similar packets, and the module for disconnection event processing 333 is used for processing related events of re-connection after a disconnection event.

In this preferred embodiment, the module for disconnection event processing 333 includes a proprietary protocol for data resending processes 404, a parameter of limitation times for data resend 405, and an authenticator for source ID 406. As shown in FIG. 22, the proprietary protocol for data resending processes 404 utilizes its resending protocol to enhance difficulty of a resending mechanism being externally hacked and used, the parameter of limitation times for data resend 405 is used for determining a resend times limitation parameter according to communication states to accordingly adjust the corresponding sending ti s so as to prevent waste of system resources on poor connection states that are unlikely recovered, and the authenticator for source ID 406 is used for determining the identification of a source that resends data so as tai prevent connection from being directed toward illegal users after disconnection.

Hence, the data transmission system with high security of the present invention can be applied to original data from different sources, and a plurality of asymmetric encoding packers are used to perform asymmetric encoding to increase complexity of the encoded data, and to perform multiplex-decoding of the encoded data.

From the above-described preferred embodiments of the present invention, a data transmission method with high security can be concluded for communicative connection of the transmitter device Tx to the receive device Rx through the data transmission channel 103. Referring to FIG. 23, the method includes the following steps:

The transmitter device Tx performs pre-processing on original data according to a source of the original data (S910); in this preferred embodiment, the source of tire original data can be a virtual machine, network function virtualization, or an IPv6-based device; the transmitter device Tx performs a plurality of asymmetric encoding packing processes on the page-processed original data to generate a plurality of sets of encoded data (S930); the encoded data are transmitted through the data transmission channel 103 (S950); and multiplex-decoding is performed on the encoded data received by the receiver device Rx to obtain restored data (S970).

In this preferred embodiment, among the steps above, when the step in which "the transmitter device Tx performs a plurality of asymmetric encoding packing processes on the pre-processed original data to generate a plurality of sets of encoded data (S930)" is performed, as shown in FIG. 24, the method further includes the following sub-steps, a data error of the original data is checked and processed (S931); pre-processing is performed on a transmission format of the original data and the processed data are generated (S933); in this preferred embodiment, the pre-processing primarily performs alignment processing on the data formal length of the original data, adds a customized header format, and generates the processed data after determining encoding length related parameters; Encoding packing is performed on the processed data and a plurality of sets of encoded data are generated (S935); in this preferred embodiment, the transmitter device Tx can use multiple asymmetric encoding packers 202 to respectively perform asymmetric encoding packing on the processed data and to generate a plurality of sets of corresponding encoded data; In another preferred embodiment, the processed data can also be encoded data correspondingly generated from encoding packing performed by one single asymmetric encoding packer 202; The step in which "the encoded data are transmitted through the data transmission channel (S950)" is performed in succession.

Further, in this preferred embodiment, among the steps above, when the step in which "multiplex-decoding is performed on the encoded data by the receiver device Rx to obtain restored data (S970)" is performed, as shown in FIG. 25, the method further includes the following sub-steps: the integrity of the encoded data is determined (S971); in this preferred embodiment, the integrity of the encoded data can be determined by way of performing a key mechanism (such as a public-private key mechanism), verifying a digital signature, checking a packet serial number, determining whether an N/A value exists, determining whether a replay attack exists and/or determining whether additional data are injected; in this preferred embodiment, modifiable and non-modifiable parts in the forms and fields of the data packets can be identified to determine whether an unreasonable change exists; the packet length of the encoded data is adjusted (S973); multiplex-decoding is performed on the encoded data and decoded data are generated (S975); in this preferred embodiment, a processing process which is capable of simultaneously analyzing different encoding algorithms can be established to perform multiplex-decoding on the encoded data received; in this preferred embodiment, this step further analyzes the SMTP, FTP or HTTP encrypted for non-encrypted protocol packets, checks the legal status of a certificate of the user terminal, determines whether the encoded data are from a legal device, determines the consistency between the value of the length field and the actual length, and/or determines the legitimacy of the timestamp; the decoded data are re-edited (S977); in this preferred embodiment, the decoded data are re-edited by a customized shift and rotate algorithm so as to obtain the restored data.

Further, in this preferred embodiment, among the steps above, when the step in which "multiplex-decoding is performed on the encoded data received by the receiver device Rx to obtain restored data (S970)" is performed, as shown in FIG. 26, the method further includes the following sub-steps: the plurality of encoded data are received (S961); in this preferred embodiment, a condition of no encoded data packets exist can be further detected and processed; the step in which "the integrity of the encoded data is determined (S971)" described above is performed in succession.

Further, in this preferred embodiment, among the steps above, when the step in which "multiplex-decoding is performed on the encoded data received by the receiver device Rx to obtain restored data (S970)" is performed, as shown in FIG. 26, the method further includes the following sub-steps: the decoded data are synchronized (S976); the step in which "the decoded data are re-edited (S977)" is performed in succession.

Figure 27:
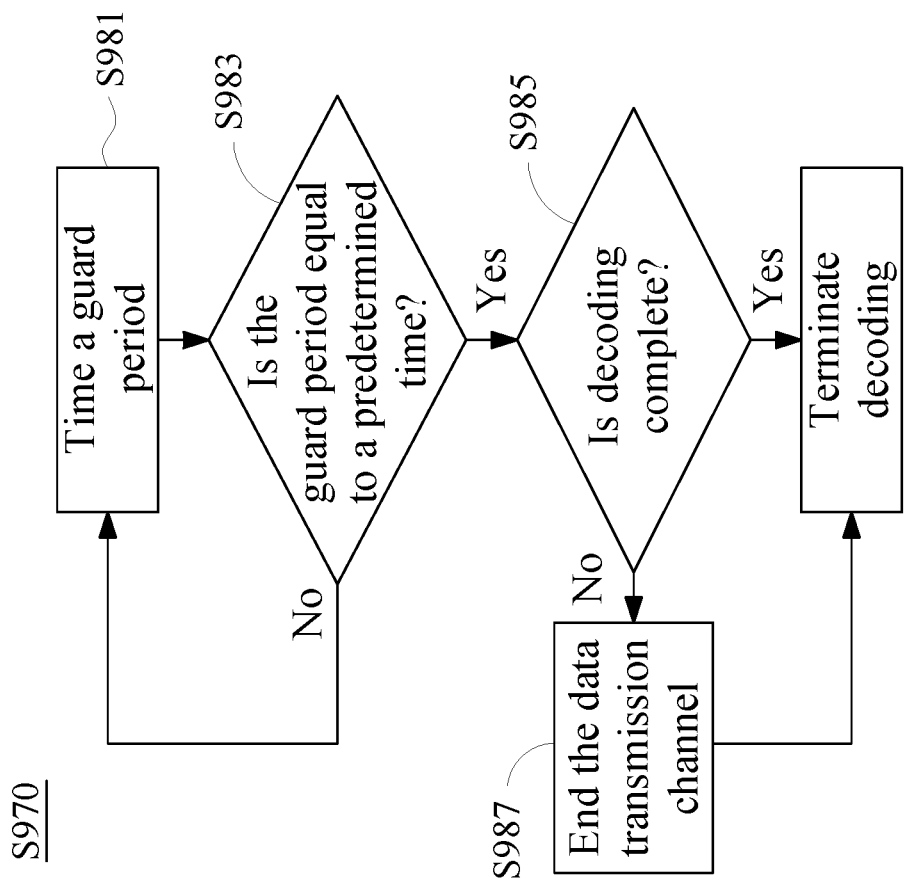
FIG. 27 is a flowchart of another sub-method according to a preferred embodiment of the present invention.

Further, in this preferred embodiment, among the steps above, when the step in which "multiplex-decoding is performed on the encoded data received by the receiver device Rx to obtain restored data (S970)" is performed, as shown in FIG. 27, the method further includes the following sub-steps: a guard period is limed (S981); it is determined whether the guard period is equal to a predetermined time (S983); if so, step (S985) is performed; if not, step (S981) is iterated; it is determined whether decoding is complete (S985); if so, a guard is set/canceled to end the decoding process; if not, step (S989) is performed; the device 103a is controlled to end the data transmission channel 103 (S987), and the decoding is terminated.

Further, in this preferred embodiment, among the steps above, when the step in which "multiplex-decoding is performed on the encoded data received by the receiver device Rx to obtain restored data (S970)" is performed, the method further includes the following sub-step; a resending mechanism is executed, wherein in the resending mechanism, on the basis of a proprietary protocol for data resending processes, a parameter of limitation times for data resend is set according to the communication slate to limit a resend times, and the identity of the source is verified.

Thus, the data transmission method with high security of the present invention can be applied to original data from different sources, and a plurality of asymmetric encoding packers are used to perform asymmetric encoding, so as to increase the complexity of the encoded data and to perform multiplex-decoding on the encoded data.

In conclusion of the above, the data transmission system and method with high security of the present invention are capable of processing original data from different sources, and a plurality of asymmetric encoding packers are used to perform asymmetric encoding so as to increase the complexity of the encoded data and to perform multiplex-decoding on the encoded data, thereby achieving enhancing security and convenience of data transmission.

While the present disclosure has been described by means of specific embodiments, numerous modifications and variations could be made thereto by those skilled in the art without departing from the scope and spirit of the present disclosure set forth in the claims.

What is claimed is:

1. A data transmission method with high security, for use in communicative connection of a transmitter device to a receiver device through a data transmission channel, the method comprising:
   performing, by the transmitter device, pre-processing of original data according to a source of the original data;
   performing, by the transmitter device, a plurality of asymmetric encoding packing processes on the pre-processed original data to generate a plurality of sets of encoded data;
   sending the encoded data through the data transmission channel; and
   performing, by the receiver device, multiplex-decoding on the encoded data received to obtain restored data;
   wherein the data transmission channel is implemented by the transmitter device selected from a base station or a ground station;
   wherein the receiver device comprises a GSM support module, an ITU IMT-2020 support module, a 3GPP-5G support module, and a high availability advanced support kit; and
   wherein the high availability advanced support kit is capable of performing bandwidth management on the receiver device for 5G eMBB and optimizing a handshaking mechanism of 5G communications and base stations.

2. The data transmission method with high security according to claim 1, wherein the step of performing, by the transmitter device, the plurality of asymmetric encoding packing processes on the pre-processed original data to generate the plurality of sets of encoded data further comprises:
   checking and processing data errors of the original data;
   performing pre-processing on a transmission format of the original data and generating processed data; and
   performing encoding packing on the processed data and generating the plurality of sets of encoded data.

3. The data transmission method with high security according to claim 1, wherein the step of performing, by the receiver device, multiplex-decoding on the encoded data received to obtain the restored data further comprises:
   determining integrity of the encoded data;
   adjusting a packet length of the encoded data;
   performing multiplex-decoding on the encoded data and generating decoded data; and
   re-editing the decoded data to obtain the restored data.

4. The data transmission method with high security according to claim 3, wherein the step of determining integrity of the encoded data comprises executing a public-private key mechanism, verifying a digital signature, checking a packet serial number, determining an N/A value, determining a replay attack or determining additional data.

5. The data transmission method with high security according to claim 3, wherein the step of performing multiplex-decoding on the encoded data and generating the decoded data comprises analyzing SMTP, FTP or HTTP encrypted or non-encrypted packets, checking legal status of a certificate of a user terminal, determining whether the encoded data are from a legal device, determining consistency between a value of a length field of the encoded data and an actual length of the encoded data, or determining legitimacy of a timestamp.

6. The data transmission method with high security according to claim 3, wherein the step of performing, by the receiver device, multiplex-decoding on the encoded data received to obtain the restored data further comprises:
   receiving the plurality of sets of encoded data; and
   performing the step of determining integrity of the encoded data in succession.

7. The data transmission method with high security according to claim 3, wherein the step of performing, by the receiver device, multiplex-decoding on the encoded data received to obtain the restored data further comprises:
   synchronizing the decoded data; and
   performing the step of re-editing the decoded data in succession.

8. A data transmission system with high security, comprising:
   a transmitter device, comprising a device type identifier and an encoding packing module, wherein
   the device type identifier performs pre-processing on original data according to a source of the original data, and
   the encoding packing module comprises a pre-processor prior to encoding packing and a plurality of asymmetric encoding packers, wherein
   the pre-processor prior to encoding packing performs pre-processing on a transmission format of the original data and generates processed data, and the asymmetric encoding packers respectively receive the processed data and generate a plurality of sets of encoded data; and
   a receiver device, communicatively connected to the transmitter device through a data transmission channel, the receiver device comprising a decoding module, wherein the decoding module comprises a multiplex-decoding processor for performing multiplex-decoding on the encoded data received to obtain restored data, a post-processor after data decoding, and a plurality of advanced optimization modules;
   wherein the advanced optimization module is implemented with a multi-path signal processor for processing time sequence issues of multi-path signals;
   wherein the post-processor after data decoding includes a decoded data encryptor which is coupled to a local environment info block for storing related information and parameters shared by a decoding/encoding mechanism and a changeable encoding mapping scheme;
   wherein the data transmission channel is implemented by a device selected from a base station or a ground station; and
   wherein the device comprises a GSM support module, an ITU IMT-2020 support module, a 3GPP-5G support module and a high availability advanced support kit.

9. The data transmission system with high security according to claim 8, wherein the encoding packing module further comprises an error correction function for checking and processing data errors of the original data prior to encoding.

10. The data transmission system with high security according to claim 8, wherein the decoding module further comprises a post-processor after data decoding, a changeable encoding mapping scheme, a timer guard, an integrity checker, an anti-noise packet length adjustment module or a plurality of advanced optimization modules.

11. The data transmission system with high security according to claim 8, wherein the device type identifier comprises a pre-processor for data from virtual machines, a pre-processor for data from NFV, and a pre-processor for data from IPv6-based devices.

12. The data transmission system with high security according to claim 8, wherein the high availability advanced support kit comprises a 3GPP2 support module, an LTE-Advanced support module, a free-licensed high-frequency communications support module and an anti-interference module for noise from legacy mobile communications.

13. The data transmission system with high security according to claim 12, wherein the high availability advanced support kit comprises a module for implementation of bandwidth management for 5G eMBB and a module for optimization of hand-shaking mechanism for data transition; wherein the module for implementation of bandwidth management for 5G eMBB includes a cache mechanism, a high priority data processor, and a bandwidth manager for defining different management mechanism according to properties of transmission media for a channel transmission through a base station, and the module for optimization of hand-shaking mechanism for data transition includes a signal variation detector for detecting signal variation of a 5G-NR mobile communication base station.

14. The data transmission system with high security according to claim 13, wherein the signal variation detector is embedded with a 5G-NR base station and the module for optimization of hand-shaking mechanism for data transition further comprises a data reorganizer for reorganizing received data and restoring an original sequence of the restored data so as to improve benefits of data processing.

15. The data transmission system with high security according to claim 12, wherein the high availability advanced support kit further comprises an advanced usability support module including a bandwidth aggregator, a V2X support module and a heterogeneous network connector.

16. The data transmission system with high security according to claim 15, wherein the high availability advanced support kit further comprises a device functions promotion module including a set of signal enhancement functions for multi-path interferences, a set of LoS coverage enhancement functions, and a set of S/W implemented signal PA functions.

* * * * *